United States Patent [19]

Richardson et al.

[11] Patent Number: 4,718,027
[45] Date of Patent: Jan. 5, 1988

[54] DYNAMICALLY ADJUSTABLE LINEAR DATA DISCRIMINATOR

[75] Inventors: John M. Richardson; Richard L. Duncan, both of Duncan, Okla.

[73] Assignee: Halliburton Company, Duncan, Okla.

[21] Appl. No.: 792,100

[22] Filed: Oct. 28, 1985

[51] Int. Cl.⁴ .................... G01V 1/40; G01V 1/24; G06F 15/00
[52] U.S. Cl. .................... 364/554; 364/422; 364/571; 367/30; 367/47
[58] Field of Search ........... 364/552, 554, 422, 571, 364/551; 369/58; 367/30, 47, 67, 38

[56] References Cited

U.S. PATENT DOCUMENTS

| 4,161,782 | 7/1979 | McCracken | 364/571 |
| 4,320,469 | 3/1982 | Frawley et al. | 364/422 |
| 4,433,385 | 2/1984 | De Gasperi et al. | 364/552 |
| 4,509,150 | 4/1985 | Davis | 364/422 |
| 4,514,809 | 4/1985 | Johnson, Jr. et al. | 364/422 |
| 4,535,625 | 8/1985 | Lyle, Jr. | 364/422 |
| 4,541,275 | 9/1985 | Kerzner | 364/422 |
| 4,554,649 | 11/1985 | Herkenhoff et al. | 367/47 |

OTHER PUBLICATIONS

Sage and Melsa, Estimation Theory with Applications to Communications and Control, ©1971, Chapter 5, sections 5.1–5.5, pp. 116–148.

Primary Examiner—Errol A. Krass
Assistant Examiner—Steven A. Melnick
Attorney, Agent, or Firm—James R. Duzan; E. Harrison Gilbert, III

[57] ABSTRACT

A method of discriminating between linear and nonlinear regions of measured data is based upon two hypotheses, one of which is a hypothesis that a response is merely a result of inherent randomness and the other of which is a hypothesis that the response is a result of a true nonlinear change greater than a value M. It is also based upon a relative cost between accepting the latter hypothesis when the former is true versus accepting the former hypothesis when the latter is true. A resulting probabilistic criterion $(M/2)+(\sigma^2/M)[\ln(P_{H0}/P_{H1})C]$ is graphically implemented for deriving offset values which can be used in a specific embodiment to construct tabular values defining linear/nonlinear regions from a presumed hypothetical straight line response.

12 Claims, 6 Drawing Figures

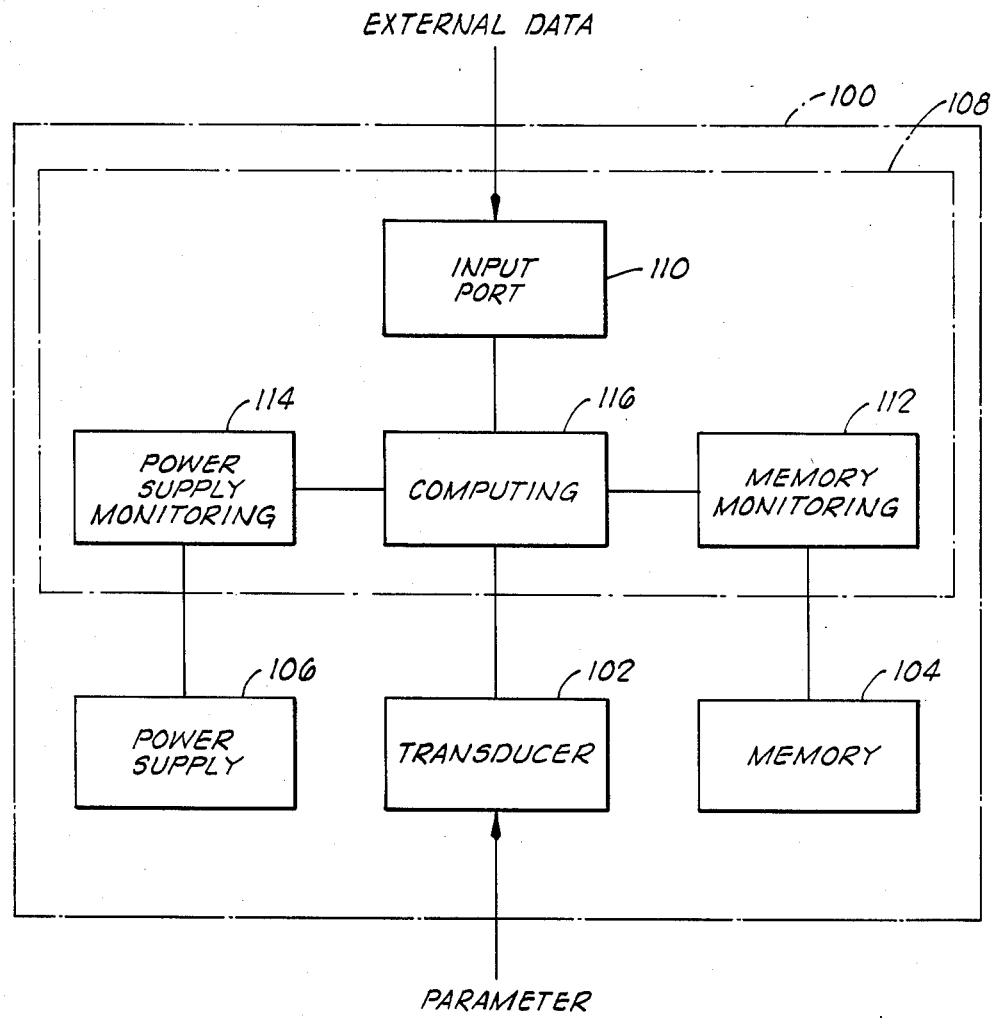

DYNAMICALLY ADJUSTABLE LINEAR DATA DISCRIMINATOR

BACKGROUND OF THE INVENTION

This invention relates generally to a method of determining whether measured data are inside or outside a predetermined region and more particularly, but not by way of limitation, to a method of controlling a downhole logging tool, used to internally record data, so that energy of a power supply and storage space of a memory located within the tool are conserved by widening, when a predetermined amount of energy or storage space has been used, the region against which data are compared.

The general problem addressed by the present invention is that of discriminating between "linear" and "nonlinear" measured data. As used herein, data are "linear" or within a "linear" region when the data are within a predetermined zone on either side of a hypothetical straight line; data not meeting this criterion are "nonlinear" or in a "nonlinear" region. That is, "linear" as used herein does not imply a datum point strictly lying on the hypothetical straight line, but rather one which is within some acceptable zone of offset.

When measured data are linear, only the two end-point abscissas and ordinates need to be retained to subsequently adequately replicate the entire region of linearity; however, when measured data are nonlinear, each nonlinear datum point requires storage of its abscissa and ordinate to completely characterize the nonlinear segment. Thus, much more data must be stored when a segment of nonlinear data is measured than when a segment of linear data is measured. This distinction is significant when the data are being recorded, such as in a solid state memory, because the quantity of storage space must also be considered if one does not want to try to store more data than the memory is capable of retaining.

By way of a specific example, to which the subsequently described preferred embodiment of the present invention is particularly adapted, a logging tool for recording pressure and temperature in an oil or gas well includes a self-contained power supply having a finite amount of usable energy and a self-contained solid state memory having a finite amount of storage space where the pressure and temperature data are to be retained. To conserve energy and storage space, it is desirable to notice when linear regions of data are measured so that only the end points of a linear segment are stored; however, when nonlinear regions of data are detected, each point is to be retained. When such a tool is first placed into the well, the operator may not be too concerned with how finely "linearity" and "nonlinearity" are initially defined (e.g., "linearity" might be narrowly defined whereby more measured data points are characterized as "nonlinear" and thus stored in the memory, thereby using more energy and storage space than if "linearity" were more broadly defined); however, as the energy and storage space are depleted, it might become apparent that if the acquisition of pressure and temperature data is to be continued, the energy or the storage space, or both, will be depleted before the desired end of the test if such initial definitions of "linearity" and "nonlinearity" are maintained. Therefore, it would be desirable to redefine the linear and nonlinear regions so that some useful data can still be retained without completely depleting the energy supply or storage space. This implies widening the initial definition of the linear region so that data points which would have been originally determined to be nonlinear, and thus recorded, would now be defined as linear and not recorded (unless a particular datum was an end point of a linear segment). It is also desirable that such regions be defined with consideration given to the probabilities of saving unnecessary data, such as spurious noise-generated data (which would unnecessarily use energy and storage space), and of not saving true data (which could destroy the overall accuracy and usefulness of the stored data).

From the foregoing example, there is a cost trade-off to be made between the cost of attempting to discriminate too finely (i.e., defining the acceptable offset for the linear region very close to the true linearity of the hypothetical line) and the cost of not discriminating finely enough (i.e., defining the offset too large). For example, if the linear region were defined too closely to the hypothetical line, the discrimination of data beyond such a close offset could result in the unnecessary storage of meaningless data arising from inherent noise which is large enough to trigger a detectable response outside the narrowly defined linear region. Such a narrow discrimination can too quickly deplete both the energy supply and storage space of the previously exemplified downhole logging tool; however, as a cost trade-off, with a narrow offset one better insures that significant data are not discarded. On the other hand, if the linear region is defined too grossly, meaningful data specifying a true nonlinear response arising from the measured parameter might be unnecessarily lost, but the chances of storing meaningless data are reduced. For the example of the downhole logging tool, the ratio of these two costs might change over time as the energy and storage space are used and the testing continues. For example, if a short logging run where to be made and a large quantity of unused energy and storage space existed, one might tend toward a cost ratio favoring a narrower definition of the linear region, whereby more than enough data are recorded, rather than risk missing what might be a significant datum point; whereas if a long testing run were to be made, one might choose to be less precise in how close to true linear the linear region was defined to insure that the energy supply and storage space were not too rapidly depleted before the end of the test. Because in practice one might not know exactly how long a test might be conducted or how much remaining energy and storage space will be needed, the foregoing indicates the need not only for a method of discriminating between linear and nonlinear regions by which general energy and storage conservation can be achieved, but also for a method by which the discrimination can be automatically, dynamically adjusted when a predefined event, such as the depletion of the energy supply or the storage space to a predetermined level, occurs. Such a dynamic capability could theoretically be applied so that recording could continue without ever totally depleting the energy supply or the storage space.

SUMMARY OF THE INVENTION

The present invention meets the foregoing needs by providing a novel and improved method for making linear and nonlinear discriminations between measured data. More particularly, the present invention provides a dynamically adjustable linear discriminator which, in the preferred embodiment, is sensitive to how much energy and storage capacity of an apparatus have been used. In response to this sensitivity, the method redefines initial linear and nonlinear regions, thereby conserving the remaining energy and storage space by being less sensitive to detected changes which would have been recorded if compared to the initial linear/nonlinear definition. A principal basis for this discrimination in the preferred embodiment is made by assigning relative costs between a false alarm event (saving unnecessary data, such as meaningless noise-generated data) and a miss event (not saving nonlinear data arising from a true reading of the parameter to be measured).

Broadly, the method of the present invention comprises the steps of selecting a relative cost, C, between a false alarm event, wherein a measurement response resulting from inherent randomness would be saved, and a miss event, wherein a measurement response resulting from a true nonlinear change in the monitored parameter would not be saved; defining a first probability, $P_{H0}$, that a measurement response is the result of inherent randomness; defining a second probability, $P_{H1}$, that a measurement response is the result of a true change in the monitored parameter; defining from the relative cost, the first probability and the second probability an offset value, X; comparing a particular measurement response Z and the offset value X to determine when Z is greater than X; and storing Z in a memory when Z is greater than X. In the preferred embodiment, the step of defining an offset value includes determining X relative to a probabilistic criterion including a factor of $\ln[(P_{H0}/P_{H1})C]$. The step of determining X includes defining a deviation, M; defining a variance, $\sigma^2$; and defining the probabilistic criterion as $(M/2)+(\sigma^2/M)[\ln(P_{H0}/P_{H1})C]$.

As implemented within a particular environment, the present invention provides a method of conserving energy of a power supply and storage space of a memory, which power supply and memory are contained within a downhole test apparatus also containing a transducer for generating a signal in response to a detected parameter, by dynamically adjusting the definition of a linear region against which a signal responsive to the transducer is compared for determining whether to retain in the memory storage space a datum representing a detected parameter. This method comprises: (a) defining a hypothetical straight line representing a hypothetical linear collection of data points of the parameter to be measured; (b) defining a first allowable variation from the straight line within which a response from the transducer will be assumed to be within a first linear region; (c) defining a second allowable variation from the straight line within which a response from the transducer will be assumed to be within a second linear region; (d) monitoring the power supply to determine if a predetermined amount of the power supply has been used; (e) monitoring the memory to determine if a predetermined amount of the memory has been used; (f) comparing signals responsive to the transducer with the first allowable variation until at least one of step (d) and step (e) indicates that at least one of the predetermined amount of the power supply and the predetermined amount of the memory has been used and thereafter comparing the signals with the second allowable variation; and (g) until at least one of step (d) and step (e) indicates that at least one of the predetermined amount of the power supply and the predetermined amount of the memory has been used, storing in the memory only a datum corresponding to a signal which is determined during step (f) to be outside the first linear region, and thereafter storing in the memory only a datum corresponding to a signal which is determined during step (f) to be outside the second linear region.

Therefore, from the foregoing, it is a general object of the present invention to provide a novel and improved method of discriminating between linear and nonlinear regions of a measured parameter. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 6 is a block diagram illustrating an apparatus with which the present invention is contemplated to be useful.

DETAILED DESCRIPTION OF THE PREFERRED EMBODIMENT

Figure 1:
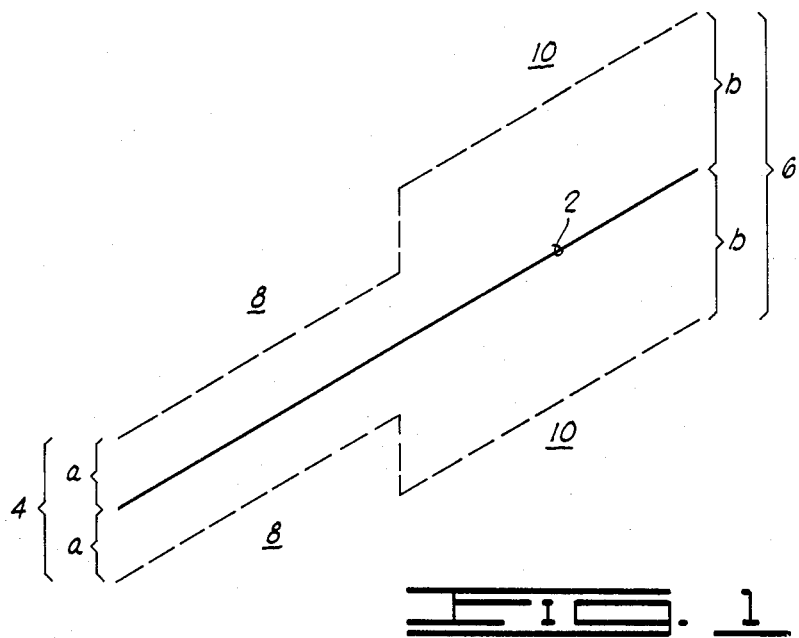
FIG. 1 depicts a hypothetical straight line having two different linearity/nonlinearity regions associated therewith.

The present invention will be described with reference to measuring a parameter, such as pressure or temperature, in a well bore; however, it is contemplated that the present invention is equally applicable to other types of measurements. Regardless of the specific use to which the present invention is put, the underlying goal of the invention is to distinguish between changes in a parameter that are either "linear", which linear changes generally need not be recorded, and changes that are "nonlinear", which nonlinear changes are to be recorded. This goal is achieved in the preferred embodiment of the present invention which provides a method of defining linear and concomitant nonlinear regions based on probability considerations whereby the regions are defined to improve the likelihood that data determined to be nonlinear are the result of true changes in the measured parameter, rather than the result of spurious information such as noise within the measurement apparatus.

One apparatus contemplated to be particularly adaptable for implementing the present invention is a microprocessor-controlled drill stem test apparatus including a self-contained power supply, having a finite amount of expendable energy defining the life of the power supply (e.g., a battery), and an internal memory having a finite storage space (e.g., a solid state memory). Such an apparatus also has a transducer for detecting the parameter to be measured, which in the preferred embodiment will be presumed to be pressure, for example. One specific type of such an apparatus is disclosed in copending U.S. patent application Ser. No. 731,230, assigned to the assignee of the present invention. This specific device utilizes integrated circuit electronics generating minimal electrical noise relative to the electrical noise generated by the particular type of transducer used, which noise characteristics are of significance as will become more apparent hereinbelow. An example of such an apparatus is shown in the block diagram of FIG. 6. In FIG. 6, a monitoring device 100 is of a type which could provide a downhole test apparatus such as the microprocessor-controlled drill stem test apparatus. The monitoring device 100 includes a transducer 102 by which the parameter, such as pressure or temperature, is detected and converted into a measurement signal. The monitoring device 100 also includes a memory 104 in which data, which the method of the present invention has indicated need to be retained, are stored. The monitoring device 100 further includes a power supply 106 used to energize the device 100. The monitoring device 100 also includes a central processing and controlling section 108. The section 108 has an input port 110 which receives external inputs. The section 108 also includes a memory monitoring component which keeps track of how much storage space remains in the memory 104. The section 108 includes a power supply monitoring component 114 which keeps track of the estimated remaining life of the power supply 106. The information obtained from the transducer 102 and the components 110, 112, 114 are provided to a computing component 116 which performs the necessary computing in implementing the present invention and in making the ultimate comparison to determine whether the monitored data are inside or outside of the defined linear region. Those data determined to be nonlinear are stored in the memory 104.

From the preferred embodiment of the present invention, a table of values is constructed for loading into the memory of the aforementioned apparatus. The values within the table are the means by which the linear and nonlinear regions are defined and the means by which the definitions of such regions can be automatically changed by microprocessor operation while the apparatus is in the well bore. Two of such multiple linear/nonlinear regions are pictorally shown in FIG. 1, wherein a hypothetical straight line 2 having a given slope is depicted. The straight line 2 and the given slope are initially presumed, such as by assuming that the detected pressure is going to change linearly with each subsequent datum point varying from the preceding one by the assumed slope. Although the line as so chosen is a hypothetical array of possible data points to be detected, the line in actuality need not approximate what will be actually detected because, of course, the actual values are unknown at the time of the assumption; however, the assumption is made as the basis for defining a linear zone or region against which each actually detected datum point can be compared to determine if the actual datum point represents a linear or nonlinear change. If what is actually detected is determined to be linear (i.e., it in fact coincides with the hypothetical collection of assumed data points or within the predefined linear region adjacent the line 2), such a linear datum point need not be saved because this linear datum point can be adequately approximated by a straight line drawn between end points of the linear segment which are stored when adjacent nonlinear data are detected. If the actual datum point is nonlinear, it is stored so that such nonlinear response can be specifically reconstructed from the data stored in the memory of the drill stem test apparatus.

From the table of discrete offset values stored in the memory and from the assumed line 2, the linear region, which allows some acceptable offset from the hypothetical line 2, is defined. From FIG. 1, one discrete offset has a value "a" which is applied along the y-coordinate direction to both sides of the line 2 to define a linear region 4, and a second offset has a value "b" which is similarly applied to a different section of the line 2 to define a linear region 6. The concomitant unbounded nonlinear region associated with the linear region 4 is indicated in FIG. 1 by the reference numeral 8, and the unbounded nonlinear region concomitant to the linear region 6 is identified in FIG. 1 by the reference numeral 10. The linear region 4 is the definition used in the preferred embodiment until a predetermined amount of the battery or memory has been used. The linear region 6 is thereafter used as more particularly described hereinbelow.

As shown in FIG. 1, a step change occurs between the linear/nonlinear regions 4, 8 and the linear/nonlinear regions 6, 10; however, it is contemplated that the present invention can be implemented to linearize or otherwise modify the transition between the different regions. The actual values a and b are selected based on the specific characteristics of the apparatus, but the ratio of a to b is based on the following probability considerations of the preferred embodiment of the present invention.

The probability considerations of the present invention generally relate to discriminating between whether an actual measurement response, Z, is within a linear region or a nonlinear region; however, this is achieved with probabilistic considerations as to whether a particular detected datum point is the result of something other than a true nonlinear change in the parameter (e.g., pressure) to be measured. With regard to the exemplary drill stem test apparatus, the measurement response Z is derived from a signal generated in response to the pressure detected by the transducer. In the preferred embodiment, the quantity Z is the magnitude by which the measured parameter deviates from the hypothetical straight line 2. This signal, specifically the quantity Z in the preferred embodiment, is compared against an allowable variation (e.g., a or b in FIG. 1) from the hypothetical straight line 2, which allowable variation defines whichever one of the aforementioned linear regions is being used at the particular time of comparison. Such an allowable variation is determined by the probability considerations of the present invention.

Figure 2:
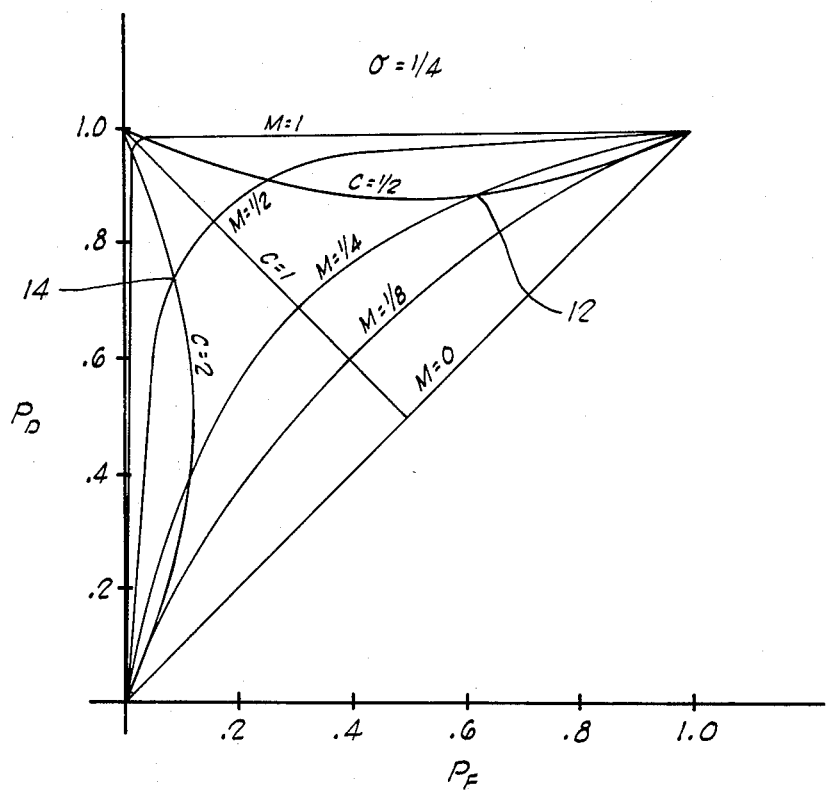
FIG. 2 is a graph of a detect probability versus a false alarm probability and the interrelationships of relative cost, C, and deviation, M, variables for a first variance.
Figure 3:
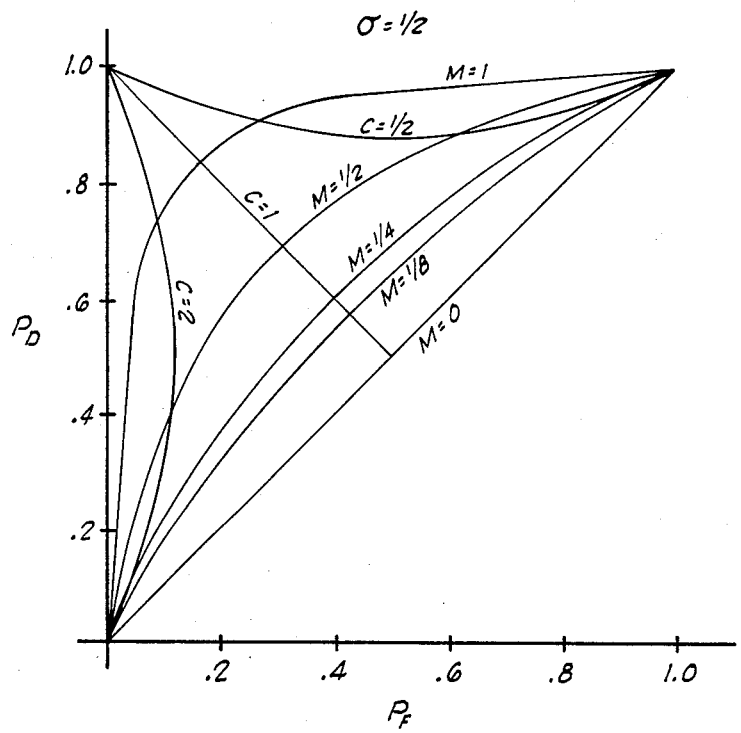
FIG. 3 is a graph similar to the graph of FIG. 2 except the graph of FIG. 3 pertains to a second variance.
Figure 4:
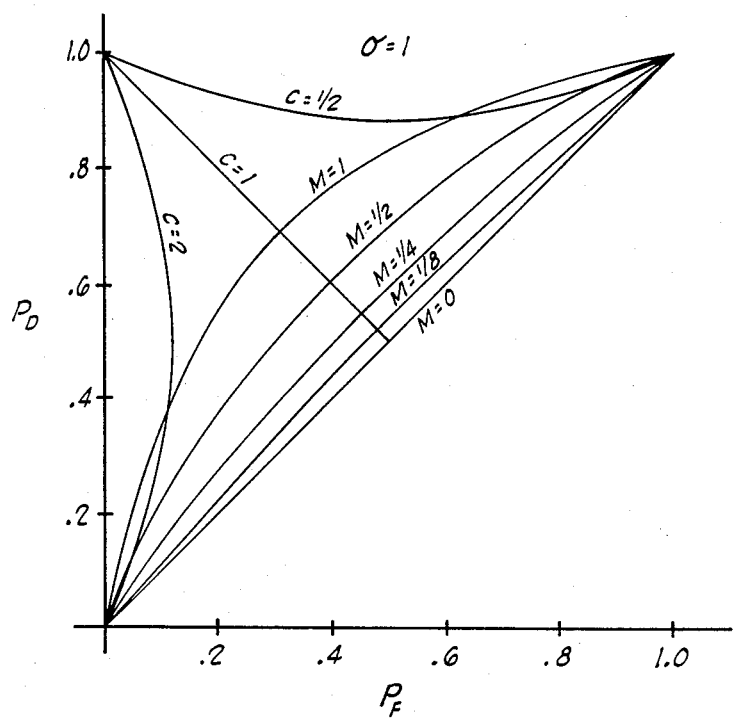
FIG. 4 is a graph similar to the graph of FIG. 2 except the graph of FIG. 4 pertains to a third variance.

In defining the allowable variations with the probability considerations of the preferred embodiment, a hypothesis test is formulated with reference to a hypothetical straight line, such as the line 2, and a deviation quantity, z, representing the deviation of the currently measured datum point from the hypothesized straight line [NOTE: as used herein the uppercase Z refers to an actual response signal used to compare with the allowable variation; the lowercase z refers to a corresponding deviation used in the preferred embodiment with the graphical values shown in FIGS. 2–4—that is, lowercase z can be considered as a specific example of uppercase Z.] With z as the decision variable, hypotheses $H_0$ and $H_1$ are defined. $H_0$ is the hypothesis that the deviation z is merely a result of inherent randomness, such as from noise within the exemplary drill stem test apparatus; and $H_1$ is the hypothesis that the deviation z is a result of a true nonlinear change in the measured parameter that is greater than a value M, where M is a selected deviation from linearity. Mathematically, the hypothesis are stated:

$$H_0: z = V, \text{ and}$$

$$H_1: z = M + V,$$

where V is normally distributed random noise with zero mean and variance $\sigma^2$ and M is the predetermined deviation from linearity. With this statement of the hypothesis, the probability of which hypothesis is true for any particular response is considered as part of defining a linear offset value, X, to enhance the likelihood that only actual nonlinear changes will be stored.

The probability that for any one sample or signal representing a particular datum point the hypothesis $H_0$ is true is defined as $P_{H0}$. The probability that the hypothesis $H_1$ is true for any particular measurement is defined as $P_{H1}$. For the exemplary use in a drill stem test apparatus, no absolute values for these two probabilities are known to us, nor do we consider such absolute values of any overriding significance; however, what we do consider significant for purposes of the present invention is an assumed ratio of these two probabilities indicating a relative likelihood. In the preferred embodiment this ratio is assumed to be 1 because our assumption is that for any one sample, it is equally likely that it is the result of inherent randomness as it is the result of a true nonlinear change. Of course, other assumptions as to this ratio can be made and applied within the scope of the present invention.

Three other probabilities having significance in the present invention are a false alarm probability, $P_F$, a miss probability, $P_M$, and a detection probability, $P_D$. The false alarm probability is defined as the probability of accepting the hypothesis $H_1$ when in reality the hypothesis $H_0$ is true (i.e., the probability of saving unnecessary data in our specific example). That is, this is the probability of a false alarm event wherein a measurement response arising from something other than the result of a true change in the parameter to be measured, such as from inherent randomness or noise, would be saved. The miss probability relates to a miss event wherein a measurement response resulting from a true nonlinear change in the monitored parameter would not be saved. In terms of the hypotheses $H_0$ and $H_1$, the miss probability is the probability of accepting $H_0$ when $H_1$ is true. The detection probability is the converse of the miss probability in that it represents properly detecting and saving a datum representing a true nonlinear change. Therefore, $P_D = 1 - P_M$.

Because the present invention in its preferred embodiment is concerned with the efficient utilization of energy and memory storage space, costs can be assigned to the false alarm and miss events. That is, under some operating conditions, one might consider that saving unnecessary data (a false alarm event) is preferable to missing a true nonlinear change (a miss event) whereas under other operating conditions, one might prefer to miss a true nonlinear change rather than save unnecessary data. Thus, a cost, $C_F$, can be assigned as the cost of a false alarm event, and a cost, $C_M$, can be assigned to the value of a miss event. In the present invention, any absolute costs are irrelevant because it is the ratio of $C_F$ to $C_M$ which is important in defining whether, under predetermined operating conditions, one would relatively prefer to risk saving unnecessary data rather than miss a true nonlinear change or whether one would relatively prefer to miss a true nonlinear change in the measured parameter rather than save unnecessary data. This relative cost is represented herein as a relative cost, C.

Having defined the probabilities and the relative cost, the linear offset value, X, is defined or computed by using in the preferred embodiment the Gaussian (normal) density function since the noise in the exemplary system is additive and Gaussian. In this exemplary environment this noise is substantially that electrical noise generated by the transducer, which is significantly greater than the noise generated by the integrated circuit electronics contemplated to be utilized in the remainder of the apparatus. Referring to the initial two hypotheses, $H_0$ and $H_1$, and the measurement deviation z, the conditional density functions for the hypotheses are:

$$P_z/H_0 = [1/(\sqrt{2\pi}\sigma)]e^{-z^2/2\sigma^2}$$

$$P_z/H_1 = [1/(\sqrt{2\pi}\sigma)]e^{-(z-M)^2/2\sigma^2}$$

Taking the natural logarithm (ln) of the ratio, R, of these densities yields:

$$\ln R = [-(z-M)^2 + z^2]/2\sigma^2 = M[z - (M/2)]/\sigma^2 \quad (1)$$

For the costs as defined hereinabove and by using the theory of Lagrange multipliers, equation (1) constitutes a likelihood ratio test with a threshold given by $\ln[(P_{H0}/P_{H1})C]$. From this, the decision of which hypothesis to accept (i.e., to save or not to save) is made by the following probabilistic criterion:

$$\begin{array}{c} \text{accept } H_1 \\ [M(z - (M/2))]/\sigma^2 \gtrless \ln[(P_{H0}/P_{H1})C], \text{ or equivalently,} \\ \text{accept } H_0 \end{array} \quad (2)$$

$$\begin{array}{c} \text{accept } H_1 \\ z \gtrless (M/2) + (\sigma^2/M)[\ln(P_{H0}/P_{H1})C]. \\ \text{accept } H_0 \end{array}$$

The quantity on the right-hand side of equation (2) is the probabilistic criterion of the preferred embodiment of the present invention and is equated herein as the basic offset value, x, against which the deviation, z, is compared. Because a specific value of x is derived from the graphical values shown in FIGS. 2-4 (as subsequently more particularly described), x is a specific example of the general ultimate offset, X. Two examples of specific values of X are the values a and b shown in FIG. 1, which specific values are ultimately derived from x and the characteristics of the specific apparatus.

With equation (2), one can determine values for x by selecting appropriate values for the variables M and C. The variance variable, $\sigma^2$, is also selected; however, it is dependent upon the hardware used and the noise generated thereby, as empirically tested or assumed. The variables M and C, on the other hand, are selected based upon how one wishes the apparatus to operate over time. In the preferred embodiment having reference to the drill stem test apparatus and the goal of achieving efficient utilization of the battery and memory to the extent of maintaining sufficient energy and storage space to accommodate whatever testing time period is desired, one would select different specific values of M and C to define two or more values of x for use in determining the ultimate variations a and b relative to an adjustment event at which the relative importance between a false alarm event and a miss event changes. In the preferred embodiment, such an adjustment event is defined relative to the amount of energy the power supply has expended or the quantity of storage space the memory has used as more particularly described hereinbelow. Regardless of what the adjustment event is, however, one selects the desired values of M and C based upon desired false alarm and detection probabilities, which selection will be graphically illustrated with reference to FIGS. 2-4.

Generally, each of the graphs of FIGS. 2-4 shows a family of curves of the detection probability, $P_D$, versus the false alarm probability, $P_F$, for values of M ranging from 0 to 1 and for values of C ranging from $\frac{1}{2}$ to 2. Each figure corresponds to a different value of the standard deviation, ranging from $\frac{1}{4}$ to 1. It will be noted that on each graph, as M increases for a given value of $P_F$, the value of $P_D$ also increases because larger deviations from linear are easier to detect accurately than are smaller deviations. Correspondingly, $P_F$ decreases for a fixed value of $P_D$ as M increases. As M increases without bound, a detection probability arbitrarily close to 1 occurs for any value of false alarm probability.

It is also to be noted that when the cost ratio C is less than 1, indicating that the relative cost of a miss is greater than the cost of a false alarm, the graphs show that there is a relative insensitivity in the detection probability as compared to the false alarm probability (e.g., for $C=\frac{1}{2}$, compare the possible values of $P_D$ over the full range of values of $P_F$). On the other hand, if the cost ratio is greater than 1, thereby indicating that it is more desirable to risk losing true data than to store unnecessary data, there is a resulting relative insensitivity in the false alarm probability (e.g., for $C=2$, compare the possible values of $P_F$ over the full range of values of $P_D$).

Furthermore, it is to be noted that in going from the graph of FIG. 2 through the graph of FIG. 4, representing an increasing standard deviation of the noise ($\sigma$), the ability to discriminate accurately for a given value of M is diminished because the noise is a larger proportion of the deviation z.

As previously indicated, in practice (such as in the exemplary drill stem test apparatus) the value of x computed from the exemplary graphs of FIGS. 2-4 is utilized to derive a practical value which can be used with the specific scaling factors used in the specific apparatus to condition the signal from the transducer whereby the actual measured deviation, Z, is derived. Such ultimate values are represented by "a" and "b" in FIG. 1, for example.

By way of a specific example, the use of the graphs in selecting the variables M and C to be used in equation (2) for deriving the ultimate tabular values, such as "a" and "b," will be described. This will be done with reference to the graph in FIG. 2; however, the procedure is similarly applicable in FIGS. 3, 4 and other implementations. The graph of FIG. 2 will be used because it will be assumed, for purposes of this example, that the specific drill stem test apparatus in which the present invention is to be implemented has an inherent randomness, such as from noise generated by the transducer, which has been empirically determined (or assumed) to have a standard deviation to which the value $\frac{1}{4}$ has been assigned. Having selected the FIG. 2 graph, one assigns a relative cost between a false alarm event and a miss event prior to the adjustment event, which adjustment event in this example occurs when a predetermined amount of the battery or memory has been used. In our specific example, C will first be assigned the value $\frac{1}{2}$ indicating that prior to the adjustment event the cost of missing true nonlinear data is greater than the cost of storing unnecessary data. Such an assumption would be reasonable when the drill stem test apparatus is first lowered into the hole and the battery and memory have been substantially unused.

Having selected a relative cost $C=\frac{1}{2}$, a false alarm probability which would be acceptable during this first operating period is selected. In this example an acceptable $P_F$ value of slightly greater than 0.6 will be selected. For this value of $P_F$ and the assigned value of the relative cost, the deviation M to be selected is $M=\frac{1}{4}$. This is indicated in FIG. 2 by an intersection point 12 designating the intersection of the selected relative cost and false alarm probability values and the corresponding value of M. It is to be noted that for this assignment of the value of the relative cost, a high detect probability within the range between approximately 0.8 and 1.0 is obtained regardless of the selected false alarm probability. Although the value of $P_D$ will vary little, the value of M will vary between the graphically illustrated limits of $M=0$ and $M=1$, depending upon what $P_F$ value is selected.

From the foregoing selection of values to be used prior to the adjustment event, equation (2) provides that the hypothesis $H_1$ will be accepted (whereby the transducer signal is considered to define a datum point which is to be stored) when Z is greater than the appropriate specific value of a derived from $x=(\frac{1}{4})/2+(\frac{1}{4})^2/(\frac{1}{4})$ $[\ln(1)(\frac{1}{2})]=(-)0.05$ [NOTE: The negative sign is disregarded because offset is measured both positively and negatively from hypothetical line]. If Z is less than this value of a, then the hypothesis $H_0$ will be accepted whereby it will be presumed that the signal taken from the transducer response is the result of inherent randomness, or at least something other than a true nonlinear change in the measured parameter.

Next, the probabilistic criterion is to be used to define the linear/nonlinear (reject/accept) regions after the adjustment event is detected. For our specific example, this could be when the battery or memory is depleted to a predetermined level. At this time, the relative cost between a false alarm event and a miss event would likely change. For the preferred embodiment, this change is in the direction of increasing the value of C to signify that it is then more important to preserve the battery and memory by not storing unnecessary data than it is to insure that every true nonlinear change is detected and recorded. For the graphical illustration in FIG. 2, this change in the relative cost is significant by $C=2$ (if the value $C=1$ shown in FIG. 2 were selected, this would merely indicate that the false alarm event is as equally important as the miss event, not that its cost is more important as has been assumed). Under this assumption, one notes from FIG. 2 that for $C=2$, a wide range of detection probabilities can be selected with only a small probability of a false alarm event occurring. Therefore, one selects a detection probability which will be acceptable when an adjustment event is detected. For the specific example, a detection probability of slightly greater than 0.7 will be chosen so that the value of M to be selected is $M=\frac{1}{2}$, as indicated by the intersection point 14 shown in FIG. 2. With this selection of values, the resulting false alarm probability is approximately 0.1. Inserting these values into the probabilistic criterion defined by equation (2), one defines a new offset value, $x_1$, used to ultimately define the value of b against which the measured deviation Z is compared to determine which of the two hypotheses, $H_0$ or $H_1$ is accepted. For this example, the value of $x_1$ equals $(\frac{1}{2})/2+(\frac{1}{2})^2/(\frac{1}{2})[\ln(1)(2)]=0.337$.

Having thus defined absolute values for x and $x_1$ using the probabilistic criterion of equation (2), one can derive the aforementioned tabular values a and b to be stored in the memory of the drill stem test apparatus by selecting absolute values which will operate properly within the specific drill stem test apparatus but which also maintain a ratio between them corresponding (at least approximately) to the ratio of the calculated values of x and $x_1$. Thus, for the specific embodiment wherein the ratio of x to $x_1$ is 0.05/0.337, the tabular values should be selected to have at least approximately this same ratio to cause the apparatus to operate in accordance with the values selected from the graph. Thus, if an absolute value of 5 were needed to properly define the first linear range within the specific drill stem test apparatus (i.e., a=5), the second value corresponding to b shown in FIG. 1 should be 33.7.

Once these offset values are determined, the actual measurement response Z, which has a corresponding absolute value for proper comparison with the values a and b, is compared to the appropriate tabular value. If Z is greater than the tabular value, then it is presumed that the measured response is the result of a true nonlinear change and is accordingly stored in the memory. If it is less than the tabular value, it is not stored.

When multiple offset values, defining multiple linear/nonlinear regions, are used and selected based upon a detected adjustment event, the method of the present invention also includes monitoring for the adjustment event and comparing the measurement response to the appropriate value based upon whether the adjustment event has been detected. Thus, if the adjustment event were defined relative to how much of the power supply or memory had been used, the signals responsive to the transducer would be compared with the initial allowable variation (repesented by the value a in FIG. 1) until at least one of the predetermined amounts had been determined to have been used, and they would thereafter be compared with the other allowable variation (represented by the value b in FIG. 1). That is, until the adjustment event is detected, only signals determined to be outside the linear region 4 (and thus within the nonlinear region 8) would be stored until the adjustment event occurred. Thereafter, only responses detected to be outside the linear region 6 (and thus within the nonlinear region 10) would be stored. A flow chart of a program implementing such a specific method wherein the adjustment events are defined by the expenditure of energy and memory storage space is shown in FIG. 5.

Figure 5:
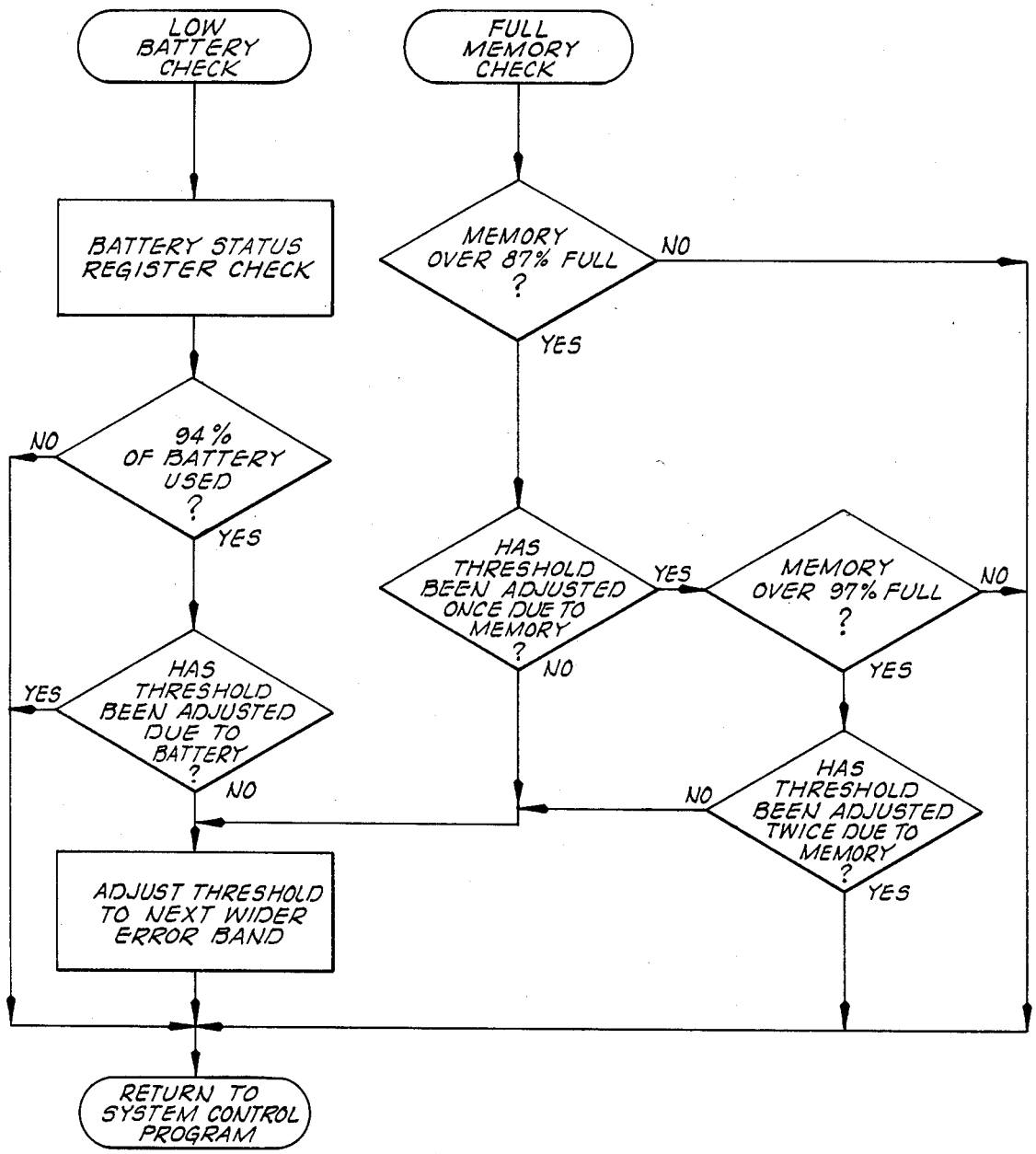
FIG. 5 is a flow chart of a dynamically adjustable discrimination technique responsive to predetermined levels of energy and storage space being used.

For the FIG. 5 flow chart, the discrimination adjustment criteria are implemented relative to the percentage of memory used in the percentage of battery power consumed. The memory use measurement provides for two adjustment points. The first adjustment occurs when the memory is approximately 87% full. At that time, the error band or linear region is widened by one step to the next setting from the table of programmable values derived from the previously described use of the graphs shown in FIGS. 2-4 and the probabilistic criterion (e.g., change from region 4 to region 6 in FIG. 1).

The second memory use adjustment occurs when the memory is at approximately 97% capacity. The threshold is again widened by one step in the table, which would be done by deriving a third allowable variation from the straight line in a manner similar to the way the first two allowable variations a and b were determined. Such third value would be used in similar comparing and storing steps to retain only that data outside such third linear region. In a specific embodiment, the adjustment events can be defined by monitoring the bits of a memory address word. When the three most significant bits of a 16-bit memory address word are set for the first time, this indicates that 87.5% of the memory has been used. When the five most significant bits are detected to have been set for the first time, this indicates that 96.875% of the memory has been used.

The power use measurement of the FIG. 5 flow chart provides a single adjustment point to be made when the battery condition register indicates that approximately 94% of the total battery power has been expended. When this adjustment event is detected, the linear region is incremented. In a specific embodiment, a change due to the battery condition can be made when the four most significant bits of a 16-bit battery use register are set, indicating 93.75% of the battery has been used.

For the method depicted by the flow chart of FIG. 5, a total of four values are needed to define the initial linear region, used before one of the adjustment events occurs, and the three increasingly wider linear regions, which would be implemented as the two memory thresholds and the one power supply threshold are detected. That is, an additional two allowable variations, c and d (not shown), would be derived in manners similar to how a and b were derived. One difference, however, might be that instead of increasing the value of C, one might increase the value of M whereby the offset would be increased.

In conclusion, it is apparent from the foregoing that there are four variables available for determining the operating characteristics of the data collection discriminating method of the present invention. These are the probability of detection, $P_D$, the probability of false alarm, $P_F$, the relative cost ratio, C, and the threshold detection level, M. It is important to note the flexibility these variables provide. For example, as a downhole test progresses in the manner as exemplified herein, it is very likely that the relative cost of false alarms to misses will change as memory and power are used. This implies that the operating regime as illustrated in the graphs of FIGS. 2-4 could change from the upper to the lower portions of the drawings (e.g., $C=\frac{1}{2}$ region to $C=2$ region). Another way to change the operating regime is to change the deviation, M. By specifying the desired values of these variables, such as based upon the various states of memory utilization, battery power remaining and accuracy of linear discrimination desired, a finely tuned, accurate method results which also is sensitive to hardware constraints.

Although a specific implementation, utilizing a table of values, has been described herein, other implementations are likely possible and yet are within the scope of the present invention. For example, the probabilistic criterion could itself be directly used, rather than a predetermined table. Also by way of example, other probabilistic criteria could be used if the specific implementation required, for example, the use of a different density function. As a further example, a non-zero mean could be used.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts and the performance of steps can be made by those skilled in the art, which changes are encompassed within the spirit of this invention as defined by the appended claims.

What is claimed is:

1. A method of selecting, for storage in a memory, data representing nonlinear changes in a monitored parameter, comprising:

monitoring a parameter to obtain a signal representing a measurement of the parameter;

converting the signal into a measurement response, Z, representing the deviation of the measurement of the parameter from a hypothetical straight line;

determining a linear region within an allowable variation from the hypothetical straight line, including:

selecting a relative cost, C, between a false alarm event, wherein a measurement response resulting from inherent randomness would be saved, and a miss event, wherein a measurement response resulting from a true nonlinear change in the monitored parameter would not be saved;

defining a first probability, $P_{H0}$, that a measurement response is the result of inherent randomness;

defining a second probability, $P_{H1}$, that a measurement response is the result of a true change in the monitored parameter; and defining from the relative cost, the first probability and the second probability an offset value, X, as the allowable variation by which the linear region is determined;

comparing the measurement response Z and the offset value X to determine when Z is greater than X and thus to determine when Z is outside the linear region so that Z then represents a nonlinear change in the monitored parameter; and storing Z in the memory when Z is greater than X.

2. A method as defined in claim 1, wherein the step of defining an offset value includes determining the offset value X relative to a probabilistic criterion including a factor of $\ln[(P_{H0}/P_{H1})C]$.

3. A method as defined in claim 2, wherein the step of determining X includes:

defining a deviation, M;

defining a variance, $\sigma^2$; and defining the probabilistic criterion as $(M/2)+(\sigma^2/M)[\ln(P_{H0}/P_{H1})C]$.

4. A method for selecting, for an apparatus having normally distributed noise with variance $\sigma^2$, data representing nonlinear changes in a measured parameter, comprising:

generating a signal in response to the measured parameter;

deriving an amount Z by which the magnitude of the signal deviates from a preselected straight line;

determining a linear offset, X, on either side of the straight line so that a linear region about the straight line is defined, including the steps of:

selecting a cost ratio, C, indicating the relative importance between a false alarm event of saving as a true nonlinear change of the measured parameter a datum which is not such a true nonlinear change and a miss event of discarding a datum which is such a true nonlinear change;

selecting a deviation, M, which taken with the selected cost ratio C yields a probability, $P_F$, that a false alarm event will occur; and computing with the cost ratio C, the deviation M, and the variance $\sigma^2$, the linear offset X; and comparing the signal deviation Z with the linear offset X to determine if the signal represents a value outside the linear region defined by X and the preselected straight line and thus to determine if the signal represents a nonlinear change in the measured parameter.

5. A method as defined in claim 4, wherein the step of computing includes:

selecting a ratio between a probability, $P_{H0}$, that any one signal is the result of noise and a probability, $P_{H1}$, that any one signal is the result of true nonlinear change in the measured parameter; and defining the offset X relative to the quantity $(M/2)+(\sigma^2/M)[\ln(P_{H0}/P_{H1})C]$.

6. A method as defined in claim 4, further comprising:

defining an adjustment event as a time at which the relative importance between a false alarm event and a miss event changes;

selecting another cost ratio, $C_1$, indicating the changed relative importance occurring at an adjustment event;

selecting another deviation, $M_1$, which taken with the cost ratio $C_1$ yields a probability, $P_D$, that a detected event, wherein a datum representing a true nonlinear change is saved, will occur;

computing with the cost ratio $C_1$, the deviation $M_1$ and the variance $\sigma^2$ another value representing another offset, $X_1$, from the straight line within which another linear region is defined;

detecting when an adjustment event occurs; and after detecting when and adjustment event occurs, actuating the storage device to store a datum within the storage device only if the datum is outside the another linear region defined by $X_1$.

7. A method as defined in claim 6, wherein:

the step of computing the linear offset X includes:

selecting a ratio between a first probability, $P_{H0}$, that any one signal is the result of noise and a second probability, $P_{H1}$, that any one signal is the result of a true change in the measured parameter; and defining the linear offset X in correspondence with the quantity $(M/2)+(\sigma^2/M)[\ln(P_{H0}/P_{H1})C]$; and the step of computing the linear offset $X_1$ includes defining the offset $X_1$ in correspondence with the quantity $(M_1/2)+(\sigma^2/M_1)[\ln(P_{H0}/P_{H1})C_1]$.

8. A method of conserving energy of a power supply and storage space of a memory, which power supply and memory are contained within a downhole test apparatus also containing a transducer for generating a signal in response to a detected parameter, by dynamically adjusting the definition of a linear region against which a signal responsive to the transducer is compared for determining whether to retain in the memory storage space a datum representing a detected parameter, comprising:

(a) defining a hypothetical straight line representing a hypothetical linear collection of data points of the parameter to be measured;

(b) defining a first allowable variation from the straight line within which a response from the transducer will be assumed to be within a first linear region;

(c) defining a second allowable variation from the straight line within which a response from the transducer will be assumed to be within a second linear region;

(d) monitoring the power supply to determine if a predetermined amount of the power supply has been used;

(e) monitoring the memory to determine if a predetermined amount of the memory has been used;

(f) comparing signals responsive to the transducer with the first allowable variation until at least one of step (d) and step (e) indicates that at least one of the predetermined amount of the power supply and the predetermined amount of the memory has been used and thereafter comparing the signals with the second allowable variation; and (g) until at least one of step (d) and step (e) indicates that at least one of the predetermined amount of the power supply and the predetermined amount of the memory has been used, storing in the memory only a datum corresponding to a signal which is determined during step (f) to be outside the first linear region, and thereafter storing in the memory only a datum corresponding to a signal which is determined during step (f) to be outside the second linear region.

9. A method as defined in claim 8, further comprising:

(h) defining a third allowable variation from the straight line within which a response from the transducer will be assumed to be within a third linear region;

(i) monitoring the memory to determine if a second predetermined amount of the memory has been used;

(j) comparing the signals responsive to the transducer with the third allowable variation after step (i) indicates that the second predetermined amount of memory has been used; and (k) storing in the memory, after step (i) indicates the second predetermined amount of memory has been used, only a datum corresponding to a signal which is determined during step (i) to be outside the third linear region.

10. A method as defined in claim 8, wherein:

step (b) includes:
assigning a first relative cost factor, C, to storing in the memory, prior to step (d) or step (e) indicating the power supply or memory has been used to the respective predetermined amount, a datum corresponding to a signal not derived from the parameter to be measured versus not storing in the memory a datum corresponding to a signal derived from the parameter to be measured; and
computing from the first relative cost factor C the first allowable variation; and step (c) includes:
assigning a second relative cost, $C_1$, to storing in the memory, after step (d) or step (e) indicates the power supply or memory has been used to the respective predetermined amount, a datum corresponding to a signal not derived from the parameter to be measured versus not storing in the memory a datum corresponding to a signal derived from the parameter to be measured; and
computing from the second relative cost factor the second allowable variation.

11. A method as defined in claim 10, wherein:
the step of computing the first allowable variation includes:
selecting an acceptable false alarm probability of saving an unnecessary datum which is not derived from the parameter to be measured;
selecting a deviation, M, for the assigned first relative cost and the selected false alarm probability;
assigning a variance, $\sigma^2$, to the test apparatus;
assigning a value, $P_{H0}/P_{H1}$, representative of a ratio of the likelihood that a particular signal is the result of something other than the detection of the parameter to be measured and it being the result of a detection of the parameter to be measured; and
deriving the first allowable variation from the quantity $(M/2)+(\sigma^2/M)[\ln(P_{H0}/P_{H1})C]$; and the step of computing the second allowable variation includes:
selecting an acceptable detect probability of properly saving a datum which is derived from the parameter to be measured;
selecting a deviation, $M_1$, for the assigned second relative cost and the selected detect probability; and
deriving the second allowable variation from the quantity $(M_1/2)+(\sigma^2/M_1)[\ln(P_{H0}/P_{H1})C_1]$.

12. A method as defined in claim 11, wherein the steps of deriving include:
selecting absolute numerical values having a ratio corresponding to the ratio of $(M/2)+(\sigma^2/M)[\ln(P_{H0}/P_{H1})C]$ to $(M_1/2)+(\sigma^2/M_1)[\ln(P_{H0}/P_{H1})C_1]$; and
entering the absolute values into a table within the memory.

* * * * *